United States Patent [19]

Hardin

[11] 4,390,372

[45] Jun. 28, 1983

[54] DRY PRE-MIXED MORTAR

[76] Inventor: George E. Hardin, 3032 Market Pl., Bloomington, Ind. 47401

[21] Appl. No.: 189,748

[22] Filed: Sep. 23, 1980

[51] Int. Cl.$^3$ ................................................. C04B 7/35
[52] U.S. Cl. ........................................ 106/90; 106/97; 106/98
[58] Field of Search ........................... 106/90, 97, 98; 260/42.13

[56] References Cited

U.S. PATENT DOCUMENTS

| | | | |
|---|---|---|---|
| 3,196,122 | 7/1965 | Evans | 260/42.13 |
| 3,256,229 | 6/1966 | Janota et al. | 260/42.13 |
| 3,538,036 | 11/1970 | Peters et al. | 106/90 |
| 3,850,651 | 11/1974 | Duncan et al. | 106/90 |
| 3,955,992 | 5/1976 | Roberts | 106/90 |
| 3,972,723 | 8/1976 | Balle et al. | 106/97 |
| 4,118,242 | 10/1978 | Kjohl et al. | 106/98 |
| 4,137,088 | 1/1979 | Debus et al. | 106/90 |
| 4,164,426 | 8/1979 | Sinka et al. | 106/90 |
| 4,224,076 | 9/1980 | Moitra et al. | 106/97 |
| 4,263,191 | 4/1981 | Eck et al. | 106/90 |

*Primary Examiner*—James Poer
*Attorney, Agent, or Firm*—Harvey B. Jacobson

[57] ABSTRACT

A novel multi-purpose mortar composition comprises Portland cement, substantially equal amounts of fine grained stone or marble and a surfactant pre-mixed in dry form which can be added with water and masonry sand at the job site to form one coat or base coat finishes for interior and exterior use. Additionally, a high solids vinyl-acrylic latex copolymer can be added at the job site along with other additives which can modify the mortar properties.

2 Claims, No Drawings

DRY PRE-MIXED MORTAR

BACKGROUND OF THE INVENTION

1. Field of the Invention

This invention relates to mortar compositions, and more particularly to a dry mix mortar composition which can be utilized for a variety of purposes for both interior and exterior use.

2. Disclosure Statement

Mortar additives used to modify the concrete to make it more suitable for the work at hand, to gain some economic advantage or to modify the cement for particular application in a manner which would be impossible without the use of the additive are well-known. For example, it is common practice to incorporate certain additivies into cement compositions to accelerate or increase strength development, retard or accelerate initial set, inhibit corrosion of metals imbedded in the cement, as well as many other desired effects. Some additives are known to effect more than one property of concrete and, commonly, will beneficially effect one property to the detriment of another.

Certain organic compounds, such as organic surfactants, have been commonly used as water reducing agents and have been applied in both liquid and powder form. Such commonly used surfactants include the aryl and alkyl aryl sulfonates. The following listed patents each disclose the addition of surfactants into cement compositions:

| Patent Nos: | Issued | Inventor |
|---|---|---|
| 3,607,326 | 9/21/71 | Serafin |
| 4,080,217 | 3/21/78 | Falcoz et al |
| 4,137,088 | 1/30/79 | Debus et al |
| 4,164,426 | 8/14/79 | Sinka et al |
| 4,205,993 | 6/3/80 | Rosenberg et al |
| 4,209,336 | 6/24/80 | Previte. |

In U.S. Pat. No. 3,769,051, issued Oct. 30, 1973, by the present inventor, a liquid additive for mortar is disclosed which is able to retard the setting and increase the workability of mortars. This additive is in liquid form and is to be added to the cement and masonry sand at the job site with the correct amount of water. However, it is difficult for the users of the mortar to mix the correct amounts of water and liquid additive therein to provide for the improved results. Accordingly, the improved results which are realized by adding the appropriate amounts of liquid additive according to the teachings of the patent find only a moderate and uneven success during actual application on the job site.

In spite of the fact that numerous mortar additives have been proposed, a need still exists for a mortar composition which can be used for a variety of purposes and which can include a surfactant pre-mixed in dry form to the proper consistency before the water and other optional liquid containing additives are included at the job site.

SUMMARY OF THE INVENTION

In accordance with the present invention, a hydraulic mortar composition which can be used for a variety of purposes such as a one-coat finish stucco and plaster for interior and exterior surfaces, a one application spackling and drywall compound, swimming pool mortars, base and finish coats, roof coatings, patching and topping compounds, masonry mortars, exposed aggregate, stucco stone and brick for roofing tile manufacturing, lightweight floors and decking, ceramic tile cement and terrazzo mortar. The mortar composition of the present invention can be formulated for application by hand troweling, gun and roll-on finishes.

Briefly, the mortar composition of the present invention comprises about 15% to about 75% of a hydraulic cement, such as Portland cement, about 25% to 85% of a stone or marble flour and about 5 grams to no more than about 60 grams of a surfactant per 100 pounds of the dry mortar mix. These ingredients are pre-mixed in dry form and packaged. At the job site, additional masonry sand and water can be added, including a vinylacrylic latex polymer which is added when the mortar composition is used as a one-application finish coat.

An object of the present invention is to provide a mortar composition which can be utilized for a variety of purposes without substantial changes to the hydraulic binder mix.

Another object of the present invention is to provide a hydraulic binder which is pre-mixed in the dry state eliminating on-the-site additions to the pre-mix mortar.

Still another object of the present invention is to provide a dry pre-mix hydraulic binder containing a surfactant.

These together with other objects and advantages which will become subsequently apparent reside in the details of the formulations and uses as more fully hereinafter described and claimed.

DETAILED DESCRIPTION OF THE INVENTION

The mortar composition comprises a dry pre-mixed mortar including the hydraulic binder, a fine grained stone or mortar and a surfactant additive. The components are mixed thoroughly in the dry state and then packaged in 75, 80 and 100 pound bags for delivery to the job site, whereupon the conventional masonry sand, water and other liquid additives can be included and mixed before use.

The hydraulic binder used is preferably Portland cement of which any type may be used including the white and grey varieties. The hydraulic binder is present in amounts of at least 15% and up to 75% by weight of the dry mix. Preferably, the hydraulic binder will be present in amounts between 40% and 60% by weight.

The fine grained stone and marble addition to the dry mix are characterized as stone or marble flours conventionally of 200 mesh or smaller, but can be as large as 50 mesh, if desired.

The surfactant which is added can be one of many conventional surfactants which are utilized to reduce the amount of water needed in order to bring the hydraulic binder to an easily workable fluid form. One preferred surfactant consists of a sodium salt of an alykl aryl sulfonate, such as sodium dodecylbenzene sulfonate. The surfactant is conventionally added in only small amounts to the hydraulic binder. In accordance with the present invention, the surfactant can be added in amounts of up to about 5 to 60 grams per 100 pounds of the dry mix mortar. Preferably, the surfactant is added in amounts of about 5 to 40 grams per hundred pounds of dry mix.

In all single coat finish applications of the dry pre-mixed mortar compositions, a vinyl-acrylic latex copolymer conventionally used for interior and exterior paints is added. A preferred resin latex is one that is commercially available from the Union Oil Company of California, Union Chemicals Division, under the trademark "AMSCO RES" 3078. "AMSCO RES" 3078 has a solids content of about 65%, a viscosity of 1,500 to 3,000 cps., and an average particle size of 0.2–0.4 microns. Preferably, the resin is added in the amounts of one-half gallon AMSCO resin to about five gallons of water, although one gallon or more of the resin may be added to 5 gallons of water when extreme strength and bonding power is needed. In the event the resin is utilized with a dry pre-mix mortar without the hydraulic binder, one gallon of resin to five gallons of water are utilized. Base coat applications do not require the addition of the resin.

The following Examples are included to more specifically set forth exemplary mortar compositions produced in accordance with the present invention and exemplary modes of utilizng same.

EXAMPLE I

| | |
|---|---|
| Portland Cement - | 40 lbs. |
| Marble Flour - | 40 lbs. |
| Calsoft F-90* - | 14 grams. |

*Calsoft F-90 is a sodium dodecylbenzene sulfonate from Pilot Chemical Company, Cincinnati, Ohio.

For one coat finished plaster, stucco, spackling compound, pool finish coats, stucco stone and roof coating, an additional 400 lbs. of masonry sand can be added at the job site along with one-half gallon AMSCO RES 3078 to five gallons of water.

The above-mentioned formula will bond to all painted surfaces without using wire or metal lathe.

EXAMPLE II

| | |
|---|---|
| Portland Cement - | 50 lbs. |
| Stone or Marble Flour - | 50 lbs. |
| Calsoft F-90* - | 14 grams. |

*Calsoft F-90 is a sodium dodecylbenzene sulfonate from Pilot Chemical Company, Cincinnati, Ohio.

Add at job site up to 400 pounds of masonry sand.

EXAMPLE III

| | |
|---|---|
| Portland Cement - | 40 lbs. |
| Stone, Marble or Granite Flour - | 60 lbs. |
| Calsoft F-90* - | 12 grams. |

*Calsoft F-90 is a sodium dodecylbenzene sulfonate from Pilot Chemical Company, Cincinnati, Ohio.

Add at job site up to 300 pounds of masonry sand.

EXAMPLE IV

| | |
|---|---|
| Portland Cement - | 40 lbs. |
| Stone or Marble Flour - | 30 lbs. |
| Fine White Sand - | 30 lbs. |
| Calsoft F-90* - | 12 grams. |

*Calsoft F-90 is a sodium dodecylbenzene sulfonate from Pilot Chemical Company, Cincinnati, Ohio.

Up to 300 pounds of masonry sand can be added at the job site.

EXAMPLE V

| | |
|---|---|
| Portland Cement - | 45 lbs. |
| Fine Sand - | 30 lbs. |
| Calsoft F-90* - | 14 grams. |

*Calsoft F-90 is a sodium dodecylbenzene sulfonate from Pilot Chemical Company, Cincinnati, Ohio.

Up to 200 pounds of masonry sand can be added at the job site.
Note: Examples 2 through 5 are used for stucco, plaster, pool coatings and masonry mortars.

EXAMPLE VI

| | |
|---|---|
| Portland Cement - | 40 lbs. |
| Marble Flour - | 40 lbs. |
| Calsoft F-90 - | 18 grams. |

At the job site up to 300 pounds of masonry sand can be added, depending upon how fine or coarse the sand. This formula is a unique all-purpose mortar, ideal for stucco, scratch and brown coat and masonry mortar.

For Examples 2 through 6, all one application finish coats, such as plaster, stucco, pools and exposed aggregate, one-half gallon of AMSCO RES to each 100 pound bag of dry mix is utilized.

EXAMPLE VII

| | |
|---|---|
| Portland cement - | 40 lbs. |
| Marble Flour - | 40 lbs. |
| Fine Sand - | 400 lbs. |
| Wildwood Glue - (Roberts Company, Battlecreek, Michigan. | 3 lbs. |

This formulation provides for a one coat stucco.

In the above Examples, the mortar is to be applied by troweling by hand. All mortars to be gunned or pumped are the same as the mixes in the previous Examples except a powder antifoaming agent is added to the dry mix before packaging which reduces the air in the mortars, causing the mortar to flow through the pumps more evenly. Antifoaming agents come in powder form. An example of a typical formulation comprises 1 to 3 oz. per 100 lbs. of dry mix. Antifoam Q 2-3000 Dow Corning Corp., Midland, Michigan, has proven successful.

In all of the Examples utilizing the polymer latex, with or without the dry surfactant, the mix can be pumped into a mold and hardened to form one-piece roofing shingles and wall siding which can be applied in a conventional manner.

The mortar compositions in accordance with the present invention have been found to have 80% less shrinkage, more plasticity and greater tensile strength than prior art mortars. Substantially all blistering and cracking are eliminated. The mortars spread easily for efficient application. The mortars are lightweight and substantially waterproof. The mortar compositions of the present invention do not include asbestos nor do the mixes require the addition of lime, but instead utilize the finely grained marble and stone flour.

While the present invention has been described with respect to particular embodiment thereof, it will be appreciated that numerous modifications may be made by those skilled in the art without actually departing from the scope of the invention.

What is claimed as new is as follows:

1. A dry mix multi-purpose mortar composition comprising: 40% to 60% by weight Portland cement, 25% to 85% by weight finely divided stone, 5 to 60 grams of a surfactant per 100 pounds of dry mix, said finely divided stone having a particle size of between 50 mesh and 200 mesh and selected from the group consisting of marble flour, granite flour, stone flour and fine sand and at least about one-half gallon of a vinyl acrylic latex copolymer having solids content of about 65% by weight, said surfactant being an alkyl aryl sulfonate which is added in amounts of about 5 to 60 grams per 100 pounds of dry mix.

2. A mult-purpose mortar composition comprising Portland cement, 25% to 85% marble flour or fine sand or mixture thereof and additionally a vinyl-acrylic latex-copolymer containing about 65% solids by weight, said Portland cement constituting 40% to 60% of the composition by weight, said marble flour or fine sand mixtures thereof having a particle size between 50 mesh and 200 mesh, said latex copolymer is added with water in the amounts of at least one-half to one gallon to five gallons of water to be mixed with the dry composition at the job site, and a surfactant in the amount of five to sixty grams per 100 pounds of said Portland cement and marble flour or fine sand or mixture thereof, said surfactant being sodium dodecylbenzene sulfonate and an anti-foaming agent in the amounts of one to three ounces per 100 pounds of Portland cement, marble flour or sand or mixture thereof.

* * * * *